(12) United States Patent
Bezdek et al.

(10) Patent No.: US 10,989,577 B2
(45) Date of Patent: Apr. 27, 2021

(54) ULTRASONIC TRANSDUCER AND METHOD FOR MANUFACTURING AN ULTRASONIC TRANSDUCER

(71) Applicant: Endress+Hauser Flowtec AG, Reinach (CH)

(72) Inventors: Michal Bezdek, Aesch (CH); Pierre Ueberschlag, Saint-Louis (FR); Andreas Berger, Hasel-Glashütten (DE); Frank Wandeler, Remigen (CH)

(73) Assignee: Endress+Hauser Flowtec AG, Reinach (CH)

( * ) Notice: Subject to any disclaimer, the term of this patent is extended or adjusted under 35 U.S.C. 154(b) by 314 days.

(21) Appl. No.: 15/753,304

(22) PCT Filed: Jul. 26, 2016

(86) PCT No.: PCT/EP2016/067735
§ 371 (c)(1),
(2) Date: Feb. 17, 2018

(87) PCT Pub. No.: WO2017/029078
PCT Pub. Date: Feb. 23, 2017

(65) Prior Publication Data
US 2018/0245958 A1 Aug. 30, 2018

(30) Foreign Application Priority Data
Aug. 17, 2015 (DE) .................. 10 2015 113 561.2

(51) Int. Cl.
*G01F 1/00* (2006.01)
*B06B 1/00* (2006.01)
(Continued)

(52) U.S. Cl.
CPC ............ *G01F 1/662* (2013.01); *B06B 1/0666* (2013.01); *B06B 1/0644* (2013.01)

(58) Field of Classification Search
USPC .......................................... 367/163
See application file for complete search history.

(56) References Cited

U.S. PATENT DOCUMENTS 3,204,458 A * 9/1965 Gillen ..................... G01F 1/665
73/861.26
3,891,869 A 6/1975 Scarpa
(Continued)

FOREIGN PATENT DOCUMENTS

DE 19620133 A1 11/1997
DE 10341422 A1 3/2005
(Continued)

OTHER PUBLICATIONS

English Translation of DE 10-2012-201884 (Year: 2012).*
(Continued)

*Primary Examiner* — James R Hulka
(74) *Attorney, Agent, or Firm* — Mark A. Logan; Endress+Hauser (USA) Holding Inc.

(57) ABSTRACT

The invention relates to an ultrasonic transducer comprising an acoustic transformer, wherein the acoustic transformer has a transformer body having a hollow space, and there lies between the hollow space and the medium a membrane, whose center oscillates freely. Furthermore, the invention relates to methods for manufacturing such an acoustic transformer.

9 Claims, 3 Drawing Sheets

(51) Int. Cl.
  *G01F 1/66* (2006.01)
  *B06B 1/06* (2006.01)

(56) References Cited

U.S. PATENT DOCUMENTS

| | | | | |
|---|---|---|---|---|
| 4,297,607 | A | 10/1981 | Lynnworth et al. | |
| 4,755,975 | A * | 7/1988 | Ito | H04R 17/00 |
| | | | | 310/322 |
| 5,203,362 | A * | 4/1993 | Shibata | B08B 3/12 |
| | | | | 134/184 |
| 5,437,194 | A * | 8/1995 | Lynnworth | G01F 1/662 |
| | | | | 73/861.27 |
| 5,814,731 | A * | 9/1998 | Alexander | G01N 29/225 |
| | | | | 73/624 |
| 5,962,790 | A | 10/1999 | Lynnworth et al. | |
| 6,672,166 | B2 | 1/2004 | Pfeifer | |
| 7,954,387 | B1 | 6/2011 | Furlong | |
| 10,591,328 | B2 * | 3/2020 | Berberig | G10K 11/004 |
| 2002/0050768 | A1 * | 5/2002 | Beck | B06B 1/0618 |
| | | | | 310/334 |
| 2002/0190608 | A1 * | 12/2002 | Beck | B06B 1/0618 |
| | | | | 310/328 |
| 2003/0164661 | A1 * | 9/2003 | Pfeifer | G01F 1/662 |
| | | | | 310/334 |
| 2004/0113522 | A1 * | 6/2004 | Nagahara | G01F 1/662 |
| | | | | 310/326 |
| 2007/0007721 | A1 * | 1/2007 | Schoen | B65H 7/04 |
| | | | | 271/265.04 |
| 2008/0083282 | A1 * | 4/2008 | Okuda | B60Q 1/0023 |
| | | | | 73/627 |
| 2010/0154560 | A1 * | 6/2010 | Mueller | G01F 1/662 |
| | | | | 73/861.18 |
| 2010/0277040 | A1 * | 11/2010 | Klee | H01L 41/23 |
| | | | | 310/324 |
| 2013/0289593 | A1 * | 10/2013 | Hall | H01L 41/1876 |
| | | | | 606/169 |
| 2015/0057547 | A1 * | 2/2015 | Torashima | B81C 1/00182 |
| | | | | 600/459 |
| 2015/0160053 | A1 * | 6/2015 | Baumoel | G01F 1/667 |
| | | | | 73/861.28 |
| 2017/0307425 | A1 * | 10/2017 | Berberig | G10K 11/004 |

FOREIGN PATENT DOCUMENTS

| | | | | |
|---|---|---|---|---|
| DE | 102008039464 A1 | | 3/2010 | |
| DE | 102010063538 A1 | | 6/2012 | |
| DE | 102012201884 A1 | | 8/2013 | |
| DE | 202012012729 U1 | | 10/2013 | |
| DE | 102014115592 A1 * | | 4/2016 | G10K 11/004 |

OTHER PUBLICATIONS

English Translation of DE 20-2012-012729 (Year: 2012).*
Search Report for German Patent Application No. 10 2015 113 561.2, German Patent Office, dated Apr. 26, 2016, 8 pp.
Search Report for International Patent Application No. PCT/EP2016/067735, WIPO, dated Oct. 13, 2016, 13 pp.
Nöll, H: Meßwertverarbeitung in Ultraschall-Füllstandmeßgeräten. In: tm—Technisches Messen, vol. 51, 1984, No. 9, S. 313-317.

* cited by examiner

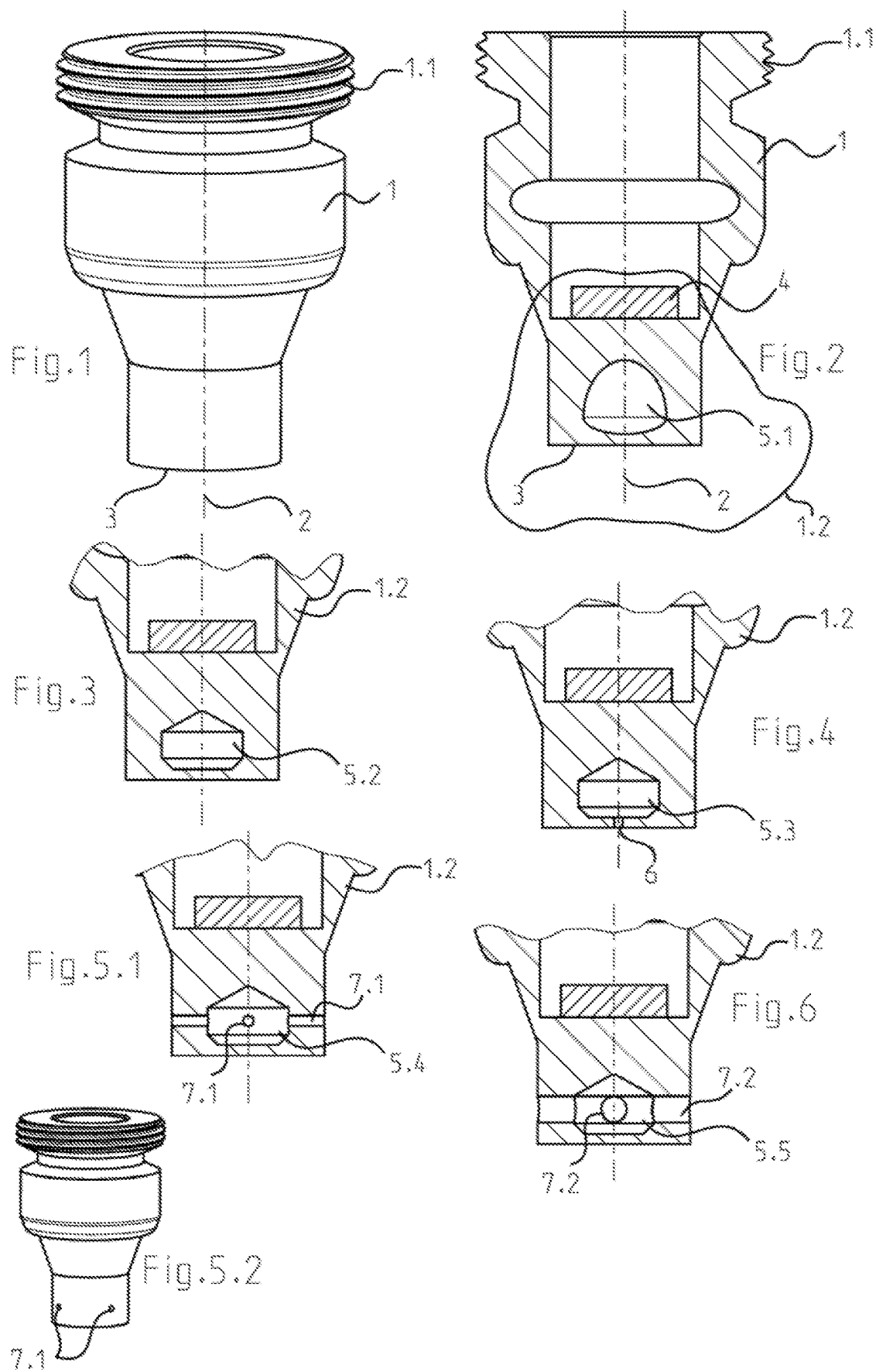

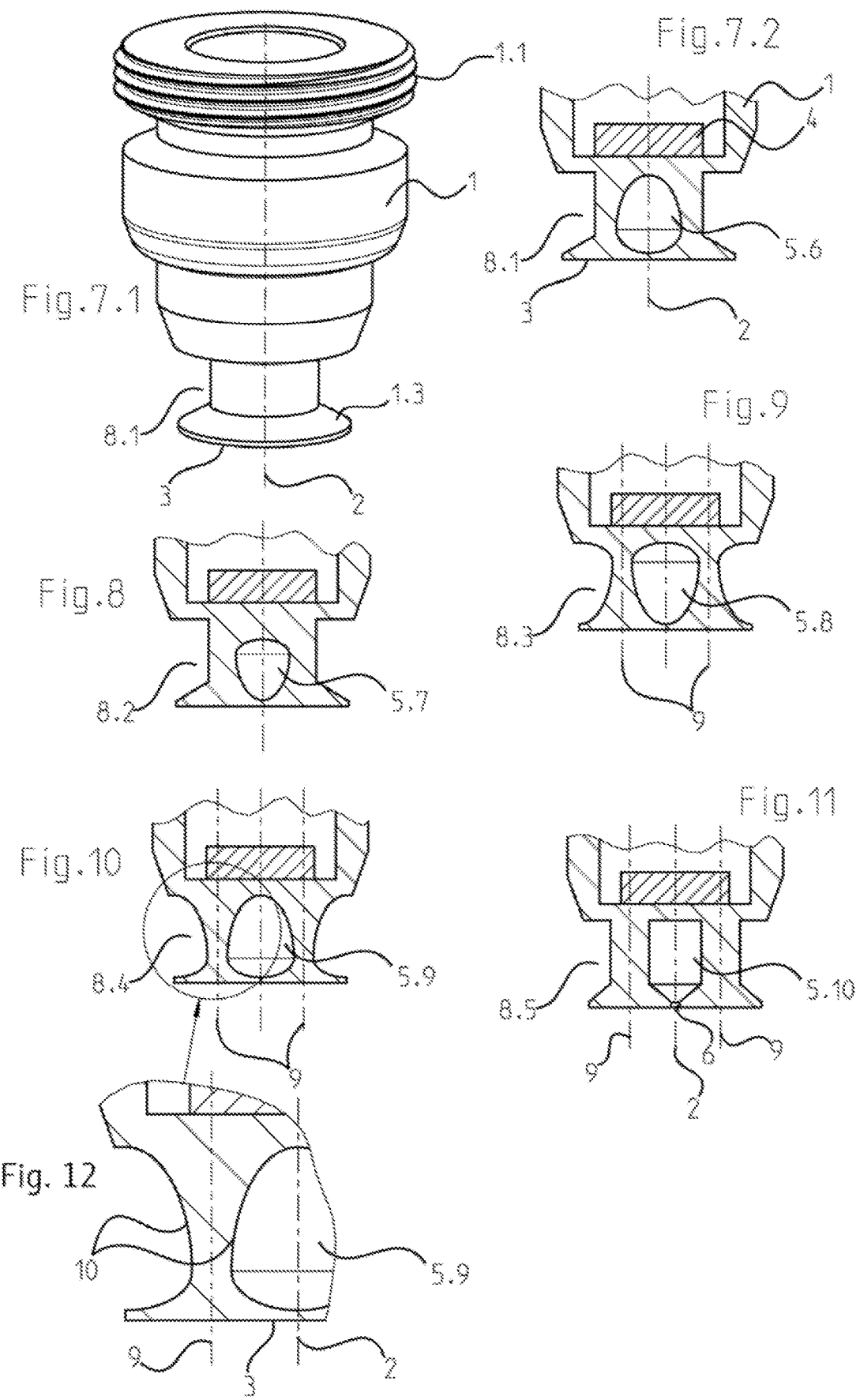

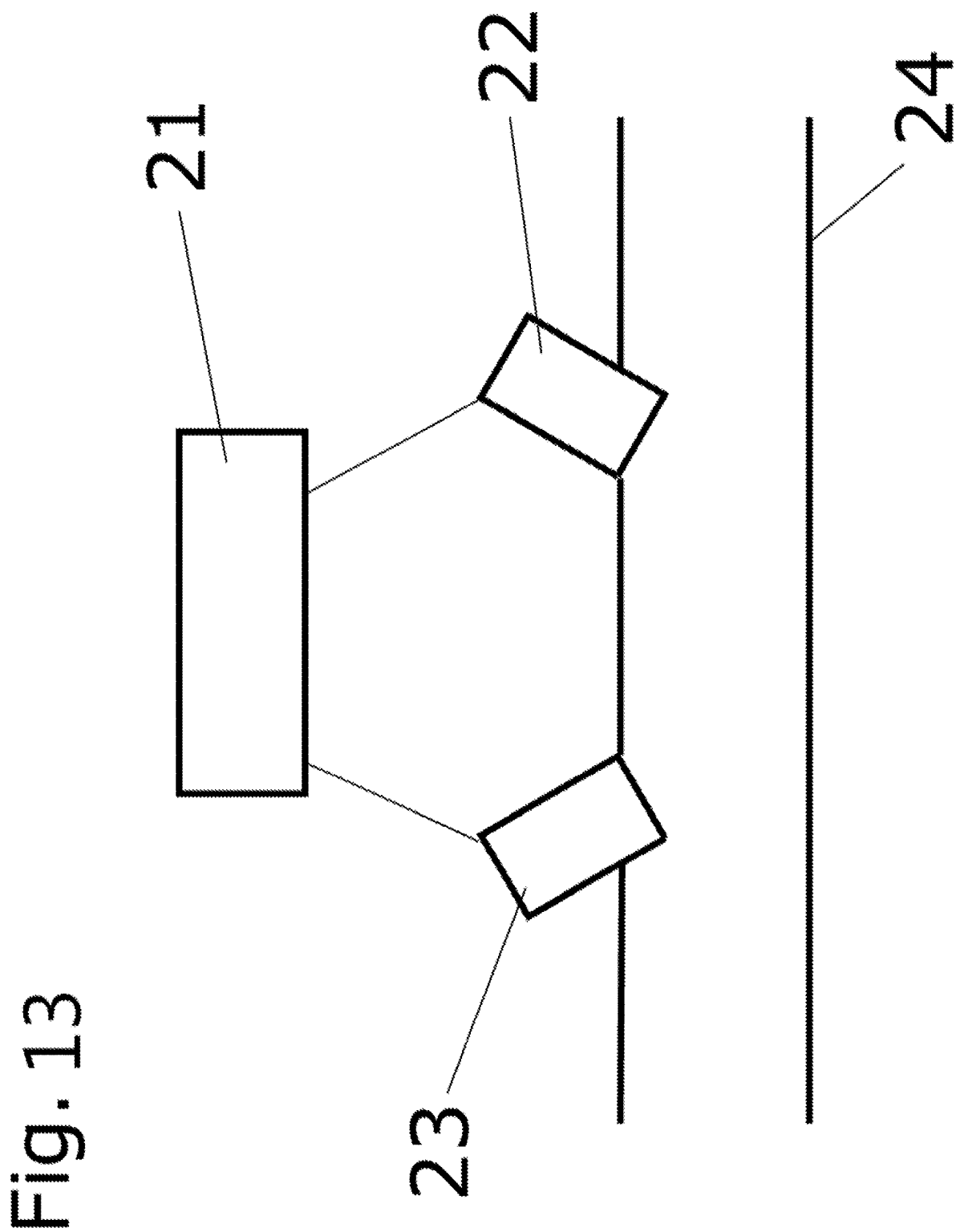

ULTRASONIC TRANSDUCER AND METHOD FOR MANUFACTURING AN ULTRASONIC TRANSDUCER

CROSS-REFERENCE TO RELATED APPLICATIONS

The present application is related to and claims the priority benefit of German Patent Application No. 10 2015 113 561.2, filed on Aug. 17, 2015 and International Patent Application No. PCT/EP2016/067735 filed on Jul. 26, 2016, the entire contents of which are incorporated herein by reference.

TECHNICAL FIELD

The invention relates to an ultrasonic transducer comprising an acoustic transformer as well as to a method for manufacturing such an acoustic transformer.

BACKGROUND

Ultrasonic transducers of the state of the art use piezotransducers, in order to convert electrical signals into pressure fluctuations in the ultrasonic frequency range and vice versa. These pressure fluctuations are, furthermore, transmitted by an acoustic transformer bidirectionally between a medium and the piezotransducer. In a possible embodiment of such a transformer, the pressure fluctuations are transmitted directly between medium and transformer. Disadvantageous here is the necessity of an impedance matching between transformer and medium, in order to increase the transmission efficiency. In such case, sensitive materials are frequently used, which leads to a limitation of the fields of application of the ultrasonic transducer. A further development of the acoustic transformer includes an oscillatable membrane in contact with the medium of a pipeline and affixed at its edge. This membrane is excited by pressure fluctuations to execute transverse oscillations, which means that an impedance matching is no longer necessary. The documents, DE10341422A1, U.S. Pat. No. 6,672,166B2 and U.S. Pat. No. 3,891,869, disclose ultrasonic transducers with such acoustic transformers. These ultrasonic transducers are, furthermore, characterized by a coupling of the membrane with a rod-shaped acoustic driver in the region of the center of the membrane. Disadvantageous in the case of such an embodiment of an ultrasonic transducer is the complex construction and the fact that the membrane has a limited ability to oscillate due to its coupling with the driver in the region of its center.

An object of the present invention is to provide an ultrasonic transducer having a simplified construction without limitation of its ability to oscillate as well as to provide a method for manufacturing the ultrasonic transducer. The object of the invention is achieved by an ultrasonic transducer as defined in independent claim 1 and by a method for manufacturing the ultrasonic transducer as defined in independent claims 9 and 10.

SUMMARY

The ultrasonic transducer of the invention includes at least one piezotransducer for producing and/or detecting ultrasonic signals; and at least one acoustic transformer, wherein the at least one acoustic transformer has a transformer body having at least one hollow space, wherein the acoustic transformer is acoustically coupled with the piezotransducer, wherein there lies between the at least one hollow space and the medium a membrane, whose center oscillates freely. The membrane, which freely oscillates in the center and is only secured on its edge, is very much less limited in its ability to oscillate in comparison with the state of the art. While membranes of the state of the art can assume only symmetric oscillation modes, antisymmetric modes of oscillation are possible in the case of the membranes of the invention. Moreover, the oscillation amplitude is maximum in the central region in the case of symmetric modes, whereby the radiation better follows surface normals.

In an embodiment of the ultrasonic transducer, the at least one acoustic transformer is adapted to transmit ultrasonic signals especially bidirectionally via the at least one membrane between the piezotransducer and the medium.

In an embodiment of the ultrasonic transducer, the at least one hollow space includes at least one opening for the medium, for example, in a lateral surface or especially in an end face. This at least one opening can be produced, for example, by drilling, wherein the at least one opening is adapted to allow a pressure equalization between the hollow space and the medium in the pipeline. In this way, a prestressing of the membrane by pressure differences can be prevented, so that the membrane can be quite thin and, thus, a maximum ability of the membrane to oscillate is assured. Furthermore, a lack of pressure equalization tends to yield a smaller oscillation amplitude in the hollow space than in the medium in the pipeline. This direction dependent amplitude causes non-linear distortions of ultrasonic signals, which can be disadvantageous for some applications.

In an embodiment of the ultrasonic transducer, the geometric construction of the ultrasonic transducer, not considering the at least one hollow space opening, is rotationally- or axisymmetric relative to the symmetry axis 2.

In an embodiment of the ultrasonic transducer, the acoustic transformer is constructed of a ceramic or glass like or metal material. Examples of metal materials are titanium, steel and aluminum. In an embodiment of the ultrasonic transducer, the working frequency of the ultrasonic transducer is at least 10 kHz and especially at least 50 kHz and at most 10 MHz, especially at most 500 kHz.

In an embodiment of the ultrasonic transducer, the membrane thickness of the ultrasonic transducer is at least 0.01 mm and especially at least 0.1 mm and at most 10 mm, especially at most 1 mm.

In an embodiment of the ultrasonic transducer, the at least one hollow space is at least partially filled by a fill material, wherein the fill material is an elastomer or foam or preferably a castable synthetic material, e.g. plastic, or especially a metal powder. In this way, the oscillatory behavior of the membrane can be influenced as regards damping of the oscillation.

A first method of the invention for manufacturing an acoustic transformer of an ultrasonic transducer, especially of an ultrasonic transducer of the invention for use in ultrasonic, flow measuring devices for measuring flow velocity or volume flow of media in a pipeline, is characterized by the fact that the acoustic transformer is manufactured by means of a generative method, in preferred manner by a 3D printing method or especially by selective laser melting.

A second method of the invention for manufacturing an acoustic transformer of an ultrasonic transducer, especially of an ultrasonic transducer of the invention for use in ultrasonic, flow measuring devices for measuring flow velocity or volume flow of media in a pipeline, is characterized by the fact that the acoustic transformer is manufactured of a number of individual parts, wherein the individual parts are combined by a combining process such as, for example, bonding with adhesive or especially welding.

Thus, provided by the present invention are an ultrasonic transducer, which includes at least one acoustic transformer, and methods for manufacturing the at least one acoustic transformer.

BRIEF DESCRIPTION OF THE DRAWINGS

The invention will now be explained in greater detail based on examples of forms of embodiment illustrated in the appended drawing, the figures of which show as follows:

FIG. 1 shows a perspective, external view of an ultrasonic transducer housing of an ultrasonic transducer of the invention;

FIG. 2 shows a cross section through a form of embodiment of the ultrasonic transducer;

FIG. 3 to FIG. 5.1 show cross sections through forms of embodiment of the acoustic transformer, which is a component of the ultrasonic transducer housing;

FIG. 5.2 shows a perspective, external view of the form of embodiment of FIG. 5.1;

FIG. 6 shows another form of embodiment of the ultrasonic transducer;

FIG. 7.1 shows a perspective, external view of a form of embodiment of the ultrasonic transducer housing;

FIG. 7.2 shows a cross section through the form of embodiment of FIG. 7.1;

FIGS. 8 to 12 show cross sections through forms of embodiment of the ultrasonic transducer; and FIG. 13 shows a schematic view of an ultrasonic, flow measuring device mounted on a pipeline.

DETAILED DESCRIPTION

The perspective, external view of a first example of an embodiment of an ultrasonic transducer housing 1 shown in FIG. 1 shows a housing with an external thread 1.1 and a terminal membrane forming a sound entrance/exit surface 3, wherein the housing except for the external thread is rotationally symmetric relative to a symmetry axis 2.

The cross section through the ultrasonic transducer housing 1, as shown in FIG. 2, shows a piezotransducer 4 mounted to the housing in the interior of the housing, an acoustic transformer 1.2, which is a component of the ultrasonic transducer housing, as well as a hollow space 5.1 located in the acoustic transformer and having rounded inner surfaces, wherein the inner surface bounding the membrane exhibits a flattening.

The cross section through the acoustic transformer 1.2 shown in FIG. 3 shows an example of an embodiment 5.2 of the hollow space located in the acoustic transformer, wherein the cross sectional area of the hollow space is bounded by straight lines.

The cross section through the acoustic transformer 1.2 shown in FIG. 4 shows an example of an embodiment of the hollow space of FIG. 3, wherein the hollow space has a terminal, axial opening.

The cross section through the acoustic transformer 1.2 shown in FIG. 5.1 shows an example of an embodiment of the hollow space of FIG. 3, wherein the hollow space has openings in its lateral surface.

FIG. 5.2 shows a perspective, external view of the ultrasonic transducer housing comprising the example of an embodiment of FIG. 5.1 and having two visible, hollow space openings located in the lateral surface.

The cross section through the acoustic transformer 1.2 shown in FIG. 6 shows a example of an embodiment of the hollow space of FIG. 3 with openings in its lateral surface, wherein the diameter of the openings forms a significant portion of the hollow space dimensions.

The perspective, external view of an example of an embodiment of the ultrasonic transducer housing shown in FIG. 7.1 shows a housing 1 having an external thread 1.1 and a membrane forming a sound entrance/exit surface 3; wherein the housing except for the external thread is rotationally symmetric relative to the symmetry axis 2; wherein the housing has, furthermore, in the region of the membrane 3 a recess 8.1 and a collar 1.3.

The cross section shown in FIG. 7.2 through the acoustic transformer 1.2 of the ultrasonic transducer housing illustrated in FIG. 7.1 includes a piezotransducer 4 mounted to the housing in the interior of the housing and a hollow space 5.6 located in the acoustic transformer 1.2, wherein the membrane is partially associated with the collar 1.3.

The cross section through the acoustic transformer 1.2 shown in FIG. 8 shows another form of embodiment 5.7 of the hollow space located in the acoustic transformer and having rounded inner surfaces, wherein the inner surface away from the membrane 3 exhibits a flattening.

The cross section through the acoustic transformer 1.2 shown in FIG. 9 shows another form of embodiment of the acoustic transformer, wherein in cross section the outer surface contour is symmetric with the adjoining inner surface relative to contour symmetry axes 9.

The cross section through the acoustic transformer 1.2 shown in FIG. 10 shows a form of embodiment similar to FIG. 9 with another hollow space geometry with an outer surface contour illustrated enlarged in FIG. 12.

The cross section through the acoustic transformer 1.2 shown in FIG. 11 shows a form of embodiment similar to FIG. 9 or FIG. 10 with another hollow space geometry and a terminal, axial opening of the membrane.

The ultrasonic, flow measuring device shown schematically in FIG. 13 includes two ultrasonic transducers 22, 23 in contact with a pipeline 24, through which a medium is flowing.

The invention claimed is:

1. An ultrasonic transducer for use in ultrasonic, flow measuring devices for measuring flow velocity or volume flow of media in a pipeline, comprising:
   a piezotransducer embodied to produce and/or to detect ultrasonic signals; and
   an acoustic transformer acoustically coupled with the piezotransducer, the acoustic transformer having:
      a transformer body having at least one hollow space within the transformer body and formed by the transformer body; and
      a membrane between the at least one hollow space and an exterior of the acoustic transformer,
   wherein the membrane is embodied such that the center portion oscillates freely, and
   wherein the acoustic transformer is embodied to transmit ultrasonic signals bidirectionally via the membrane.

2. The ultrasonic transducer as claimed in claim 1, wherein the ultrasonic transducer, not considering the at least one hollow space opening, is rotationally or axisymmetric relative to the symmetry axis.

3. The ultrasonic transducer as claimed in claim 1, wherein the acoustic transformer is constructed of a ceramic, glass-like, or metal material.

4. The ultrasonic transducer as claimed in claim 1, wherein a working frequency of the ultrasonic transducer is at least 10 kHz and at most 10 MHz.

5. The ultrasonic transducer as claimed in claim 1, wherein a working frequency of the ultrasonic transducer is at least 50 kHz and at most 500 kHz.

6. The ultrasonic transducer as claimed in claim 1, wherein a membrane thickness is at least 0.01 mm and at most 10 mm.

7. The ultrasonic transducer as claimed in claim 1, wherein a membrane thickness is at least 0.1 mm and at most 1 mm.

8. A method for manufacturing an acoustic transformer of an ultrasonic transducer for use in ultrasonic, flow measuring devices for measuring flow velocity or volume flow of media in a pipeline, comprising:
    manufacturing using a generative method including a 3D printing method or a selective laser sintering method,
    wherein the acoustic transformer includes a transformer body having at least one hollow space within the transformer body and formed by the transformer body and having a membrane between the at least one hollow space and an exterior of the acoustic transformer, and
    wherein the membrane is embodied such that the center portion oscillates freely.

9. A method for manufacturing an acoustic transformer of an ultrasonic transducer for use in ultrasonic, flow measuring devices for measuring flow velocity or volume flow of media in a pipeline, comprising:
    manufacturing a number of individual parts; and
    combining the individual parts by a combining process including bonding with an adhesive or welding,
    wherein the acoustic transformer includes a transformer body having at least one hollow space within the transformer body and formed by the transformer body and having a membrane between the at least one hollow space and an exterior of the acoustic transformer, and
    wherein the membrane is embodied such that the center portion oscillates freely.

* * * * *